(12) United States Patent
Hsieh et al.

(10) Patent No.: US 11,039,118 B2
(45) Date of Patent: Jun. 15, 2021

(54) INTERACTIVE IMAGE PROCESSING SYSTEM USING INFRARED CAMERAS

(71) Applicant: XRSpace CO., LTD., Taoyuan (TW)

(72) Inventors: Yi-Kang Hsieh, Hsinchu County (TW);
Chun-Wei Lin, Taoyuan (TW);
Cheng-Yu Hsu, New Taipei (TW);
Sheng-Hsiu Kuo, Taipei (TW)

(73) Assignee: XRSpace CO., LTD., Taoyuan (TW)

( * ) Notice: Subject to any disclaimer, the term of this patent is extended or adjusted under 35 U.S.C. 154(b) by 0 days.

(21) Appl. No.: 16/386,273

(22) Filed: Apr. 17, 2019

(65) Prior Publication Data
US 2020/0336729 A1    Oct. 22, 2020

(51) Int. Cl.
*H04N 13/239* (2018.01)
*H04N 5/235* (2006.01)
*G06T 7/70* (2017.01)
*H04N 5/33* (2006.01)
*G06T 7/50* (2017.01)
*H04N 5/232* (2006.01)

(52) U.S. Cl.
CPC ............. *H04N 13/239* (2018.05); *G06T 7/50* (2017.01); *G06T 7/70* (2017.01); *H04N 5/2353* (2013.01); *H04N 5/23229* (2013.01); *H04N 5/332* (2013.01)

(58) Field of Classification Search
CPC ...... H04N 13/239; H04N 5/2353; G06T 7/70; G06T 7/50
See application file for complete search history.

(56) References Cited

U.S. PATENT DOCUMENTS

| | | | |
|---|---|---|---|
| 5,936,245 A * | 8/1999 | Goillot | A62C 3/0271 250/330 |
| 8,213,737 B2 | 7/2012 | Steinberg | |
| 8,221,322 B2 * | 7/2012 | Wang | A61B 8/565 600/437 |
| 8,462,199 B2 | 6/2013 | Givon | |
| 8,730,309 B2 | 5/2014 | Wilson | |
| 9,224,232 B2 * | 12/2015 | Hattori | G06T 15/005 |
| 9,661,298 B2 | 5/2017 | Liu | |
| 9,807,369 B2 | 10/2017 | Usuda | |
| 9,928,420 B2 | 3/2018 | Kirk | |
| 10,256,859 B2 | 4/2019 | Fei | |

(Continued)

FOREIGN PATENT DOCUMENTS

| | | |
|---|---|---|
| CN | 106797460 A | 5/2017 |
| CN | 109658449 A | 4/2019 |

(Continued)

OTHER PUBLICATIONS

Search Report dated Oct. 11, 2019 for EP application No. 19171238.9, pp. 1-10.

(Continued)

*Primary Examiner* — Farhan Mahmud
(74) *Attorney, Agent, or Firm* — Winston Hsu

(57) ABSTRACT

An interactive image processing system including a first infrared camera, a second infrared camera, an image processing circuit, a vision processing unit, an image signal processor, a central processing unit, and a memory device is disclosed. The present disclosure calculates depth data according to infrared images generated by the first and second infrared cameras to improve depth quality.

9 Claims, 7 Drawing Sheets

(56) References Cited

U.S. PATENT DOCUMENTS

| | | | |
|---|---|---|---|
| 10,281,997 B2* | 5/2019 | Kang | G06F 3/044 |
| 10,372,974 B2* | 8/2019 | Price | H04N 9/04553 |
| 10,380,796 B2 | 8/2019 | Ma | |
| 10,466,359 B2* | 11/2019 | Meir | G01S 17/89 |
| 10,469,827 B2 | 11/2019 | Nagata | |
| 10,628,950 B2* | 4/2020 | Price | H04N 5/332 |
| 10,885,671 B2 | 1/2021 | Hsieh | |
| 2006/0087582 A1* | 4/2006 | Scharenbroch | G06K 9/00604 |
| | | | 348/370 |
| 2007/0232908 A1* | 10/2007 | Wang | A61B 8/483 |
| | | | 600/437 |
| 2011/0128386 A1* | 6/2011 | Letessier | G06F 3/04883 |
| | | | 348/164 |
| 2012/0127284 A1 | 5/2012 | Bar-Zeev | |
| 2012/0163656 A1* | 6/2012 | Wang | G06T 7/73 |
| | | | 382/103 |
| 2013/0169633 A1* | 7/2013 | Hattori | G06T 15/005 |
| | | | 345/419 |
| 2015/0341619 A1* | 11/2015 | Meir | G01S 17/87 |
| | | | 348/47 |
| 2016/0232710 A1 | 8/2016 | Herman | |
| 2017/0220142 A1* | 8/2017 | Kang | G06F 3/0425 |
| 2018/0196997 A1* | 7/2018 | Price | H04N 13/254 |
| 2018/0197274 A1* | 7/2018 | Price | G06T 7/55 |
| 2018/0253856 A1* | 9/2018 | Price | G01S 17/08 |
| 2019/0087968 A1 | 3/2019 | Grunnet-Jepsen | |
| 2019/0213389 A1* | 7/2019 | Peruch | G06K 9/00201 |
| 2019/0304113 A1* | 10/2019 | Huang | G06T 5/001 |
| 2020/0334860 A1 | 10/2020 | Hsieh | |
| 2020/0410705 A1 | 12/2020 | Huang | |

FOREIGN PATENT DOCUMENTS

| | | |
|---|---|---|
| CN | 109689173 A | 4/2019 |
| JP | 2009-258005 A | 11/2009 |
| JP | 2011-19028 A | 1/2011 |
| JP | 2013-69100 A | 4/2013 |
| TW | 201709724 A | 3/2017 |
| TW | 201816548 A | 5/2018 |
| TW | 201832547 A | 9/2018 |
| TW | I649723 B | 2/2019 |
| TW | 201913575 A | 4/2019 |

OTHER PUBLICATIONS

Search Report dated Oct. 14, 2019 for EP application No. 19171240.5, pp. 1-11.
Search Report dated Oct. 23, 2019 for EP application No. 19171242.1, pp. 1-12.
Office action dated Jan. 16, 2020 for TW application No. 108114609, filing date: Apr. 26, 2019, pp. 1-15.
Office action dated Jan. 16, 2020 for TW application No. 108114611, filing date: Apr. 26, 2019, pp. 1-11.
Office action dated Mar. 10, 2020 for TW application No. 108114623, filing date: Apr. 26, 2019, pp. 1-15.
Office Action dated Aug. 11, 2020 for the Japanese Application No. 2019-096075, filing date May 22, 2019, pp. 1-4.
Office Action dated Aug. 18, 2020 for the Japanese Application No. 2019-096208, filing date May 22, 2019, pp. 1-5.
Office action dated Mar. 9, 2021 for the U.S. Appl. No. 16/387,528, filed Apr. 17, 2019, pp. 1-21.

* cited by examiner

INTERACTIVE IMAGE PROCESSING SYSTEM USING INFRARED CAMERAS

BACKGROUND OF THE INVENTION

1. Field of the Invention

The present disclosure relates to a stereography image processing system, and more particularly, to a stereography image processing system using infrared cameras.

2. Description of the Prior Art

In a typical stereo image processing system, raw image from a red-green-blue image sensor or camera is usually subject to various preprocessing operations, e.g., image analysis, reconstruction, picture quality enhancement (including automatic white balance, exposure value, and contrast calibrations), and depth calculation.

Afterwards, the reconstructed images and the corresponding depth are inputted to a central processing unit for handling applications implemented in video gaming systems, kiosks or other systems providing an interactive interface, such as virtual reality devices, laptop computers, tablet computers, desktop computers, mobile phones, interactive projectors, television sets, or other electronic consumer devices.

However, the quality of depth calculation is unstable due to different light sources (which becomes noises to the stereo image processing system). Further, the quality of depth calculation is bad in textureless scene. Therefore, how to improve the quality of depth calculation has become a topic in the industry.

SUMMARY OF THE INVENTION

It is therefore an objective of the present disclosure to provide a stereo image processing system using infrared cameras to improve depth quality.

The present disclosure discloses an interactive image processing system including a first camera configured to generate a first infrared image; a second camera configured to generate a second infrared image; a third camera configured to generate a color image; an image processing circuit coupled to the first camera, the second camera and the third camera, and configured to calculate a depth data according to the first infrared image, the second infrared image, and the color image; and a vision processing unit coupled to the image processing circuit, and configured to perform stereo matching to the first infrared image and the second infrared image to generate a greyscale matching image, and perform color matching to the greyscale matching image and the color image to generate a color matching image.

The present further disclosure discloses an interactive image processing system including a first camera configured to generate a first color infrared image; a second camera configured to generate a second color infrared image; an image processing circuit coupled to the first camera and the second camera, and configured to calculate a depth data according to the first color infrared image and the second color infrared image; and a vision processing unit coupled to the image processing circuit, and configured to perform stereo matching to the first color infrared image and the second color infrared image to generate a color matching image.

The present disclosure calculates depth data according to infrared images generated by the first and second infrared cameras to improve depth quality. Therefore, the accuracy and efficiency of the central processing unit for handling applications (such as hand motion detection and tracking, space scanning, object scanning, AR see-through, and SLAM) may be improved to reach better user experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
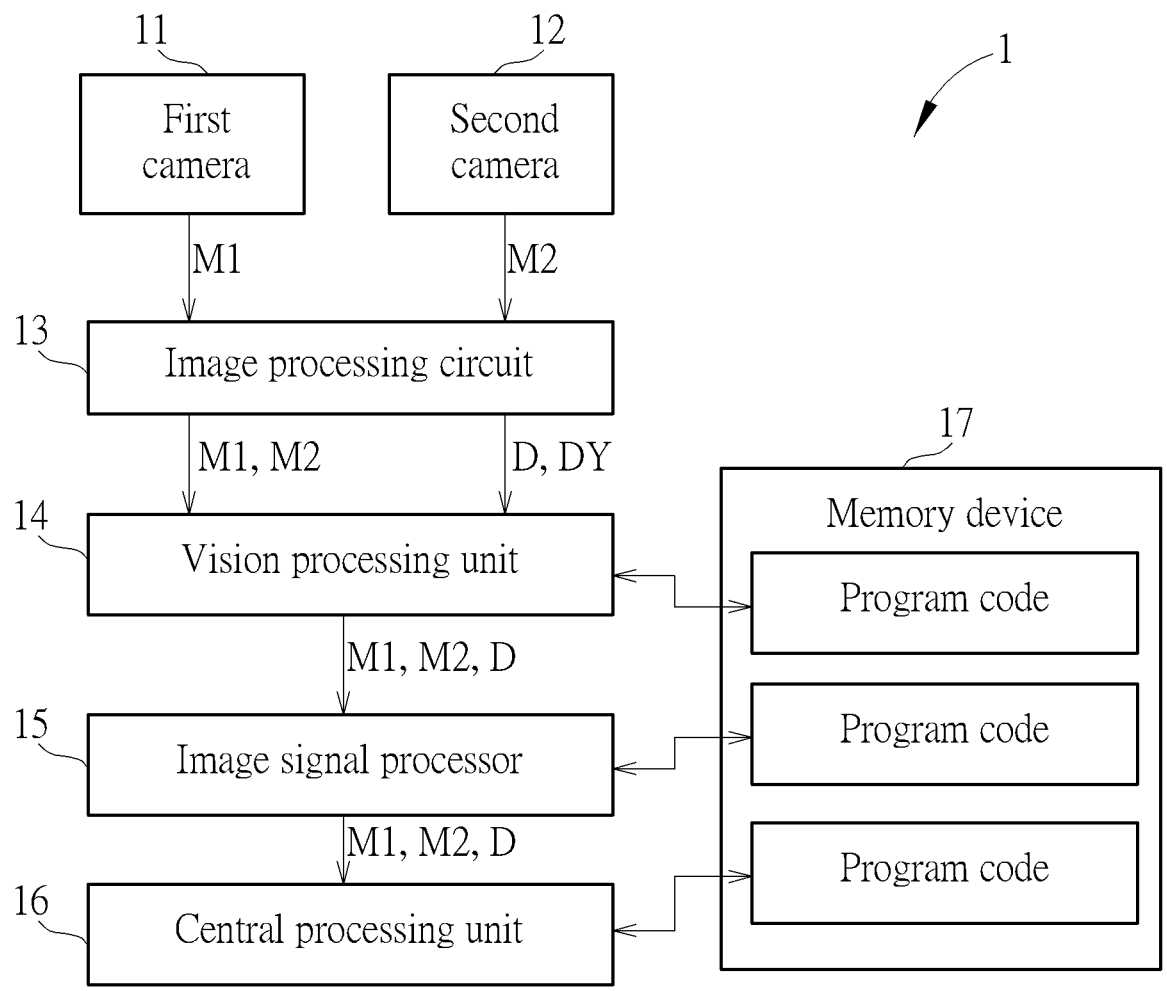
FIG. 1 is a functional block diagram of an interactive image processing system according to an embodiment of the present disclosure.

FIG. 1 is a functional block diagram of an interactive image processing system 1 according to an embodiment of the present disclosure. The interactive computation system 1 includes a first camera 11, a second camera 12, an image processing circuit 13, a vision processing unit 14, an image signal processor 15, a central processing unit 16, and a memory device 17.

The first camera 11 and the second camera 12 are coupled to the image processing circuit 13, and configured to respectively generate images M1 and M2 to the image processing circuit 13.

The image processing circuit 13 is coupled to the first camera 11, the second camera 12 and the vision processing unit 14, regarded as a depth hardware engine, and configured to calculate a depth data D corresponding to object(s) identified in the images M1 and M2. Specifically, the image processing circuit 13 identifies the object (s) in the images M1 and M2, and then takes a reference parameter (e.g., a distance between the first camera 11 and the second camera 12) into account to calculate distance(s) corresponding to the identified object(s), wherein the depth data D includes the distance(s) corresponding to the identified object(s).

In one embodiment, the image processing circuit 13 combines the images M1 and M2 with a same alignment mark into a same data package with a tag of first channel, and combines the depth data D and a dummy data DY into a same data package with a tag of second channel. The first channel is a physical way, and the second channel is a virtual way. By this way, the vision processing unit 14 is able to distinguish the data package for physical way from the data package for virtual way according to the tags of the data packages. In one embodiment, the image processing circuit 13 combines two of the image M1, the image M2, the depth data D and the dummy data DY into a data package with the tag of first channel, and combines another two of the image M1, the image M2, the depth data D and the dummy data DY into a data package with the tag of second channel, those skilled in the art may make modifications to the content of data packages according to practical requirements.

The vision processing unit 14 is coupled to the image processing circuit 13 and the image signal processor 15, and configured to perform stereo matching to the images M1 and M2 according to the depth data D. Further, the vision processing unit 14 determines at least one extracted object with a specific figure or pattern (e.g., a hand gesture) according to the images M1 and M2.

The image signal processor 15 is coupled to the vision processing unit 14 and the central processing unit 16, and configured to perform automatic white balance and exposure value calibrations to the raw images M1 and M2 to improve picture quality for object recognition and depth calculation. In one embodiment, the image processing circuit 13, the vision processing unit 14 and the image signal processor 15 may be integrated into a single chip.

The central processing unit 16 is coupled to the image signal processor 15 and the memory device 17, and configured to generate a computation result regarding applications for hand motion detection and tracking, space scanning, object scanning, AR (augmented reality) see-through, 6 Dof (six degree of freedom), and SLAM (Simultaneous Localization and Mapping) based on the images M1 and M2 and the corresponding depth data D.

The memory device 17 is coupled to the vision processing unit 14, the image signal processor 15 and the central processing unit 16, and configured to store program codes for instructing the corresponding processing units to perform specific algorithm computations. In one embodiment, the memory device 17 is integrated into the central processing unit 16, and at least one of the vision processing unit 14 and the image signal processor 15 may access the program code from the central processing unit 16 to perform related functions.

Under the architecture of the interactive image processing system 1, the present disclosure firstly calculates the depth data D corresponding to the raw images M1 and M2 using the image processing circuit 13 (i.e., the depth hardware engine), so as to replace the software calculations of digital signal processor in the prior art. Afterwards, with the operations of the vision processing unit 14 and the image signal processor 15, the images M1 and M2 with better picture quality and the corresponding depth data with higher accuracy may be obtained. Therefore, the accuracy and efficiency of the central processing unit 16 for handling applications (such as hand motion detection and tracking, space scanning, object scanning, AR see-through, and SLAM) may be improved to reach better user experience.

Figure 2:
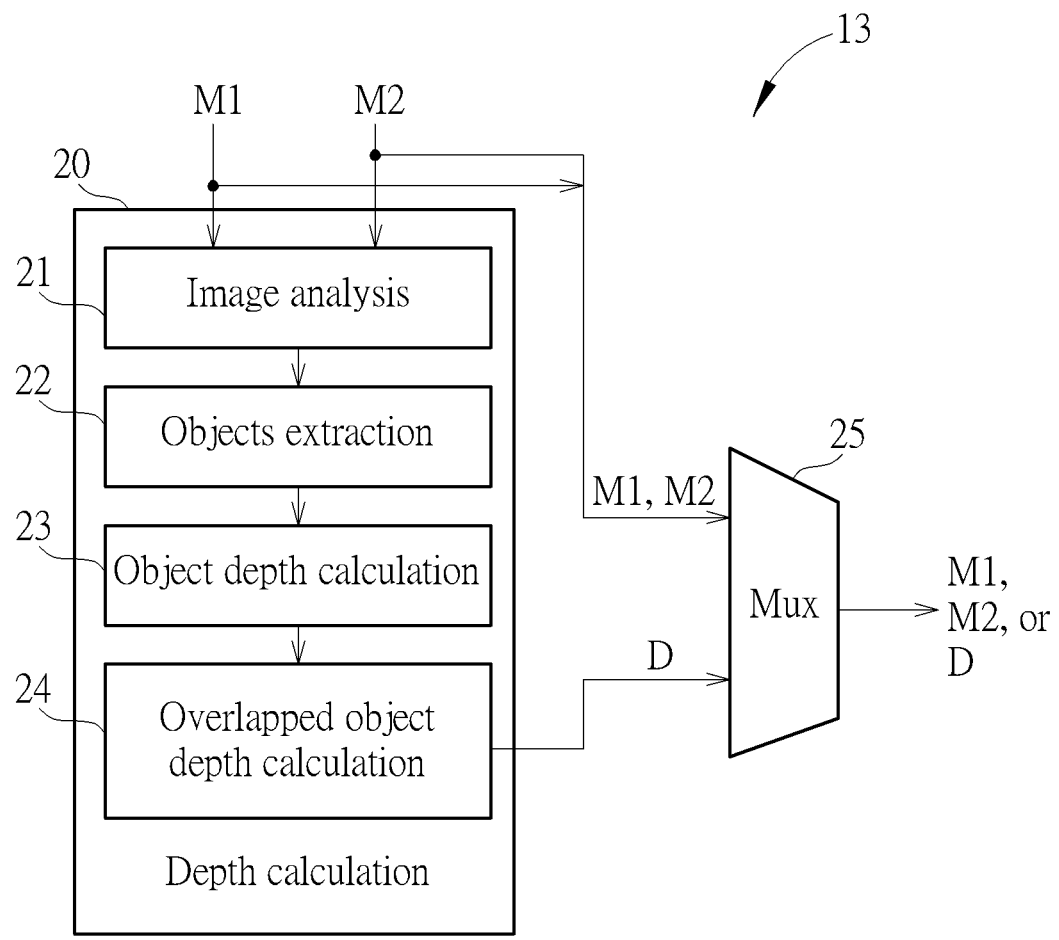
FIG. 2 is a functional block diagram of the image processing circuit according to an embodiment of the present disclosure.

FIG. 2 is a functional block diagram of the image processing circuit 13 according to an embodiment of the present disclosure. The image processing circuit 13 may be an ASIC (Application-specific integrated circuit) configured to calculate the depth data D corresponding to objects identified in the images.

The image processing circuit 13 includes an image analysis circuit 21, an object extraction circuit 22, an object depth calculation circuit 23, an overlapped object depth calculation circuit 24, and a multiplexer 25.

The image analysis circuit 21 is configured to determine whether to adjust pixel values of the images M1 and M2 to enhance picture quality. For example, when the images M1 and M2 are too dark, the image analysis circuit 21 increases exposure values of the images M1 and M2 to obtain better picture quality for the following object extraction operation.

The object extraction circuit 22 is coupled to the image analysis circuit 21, and configured to identify at least one object from the first image M1 and the second image M2.

The object depth calculation circuit 23 is coupled to the object extraction circuit 22, and configured to calculate a first depth of the at least one object according to a distance between the first and second cameras 11 and 12, a pixel distance between where the at least one object is in the first image M1 and where the at least one object is in the second image M2, and a triangulation method.

The overlapped object depth calculation circuit 24 is coupled to the object depth calculation circuit 23, and configured to calculate a second depth of two overlapped objects of the at least one object, and output the depth data D including the first depth and the second depth.

The multiplexer 25 is coupled to the overlapped object depth calculation circuit 24, and configured to output one of the first image M1, the second image M2 and the depth data D according to a control signal.

The present disclosure utilizes the image processing circuit 13 to calculate the depth data D according to the raw images M1 and M2 at the front-end of the interactive image processing system 1, so as to ease the burden of depth calculation by the digital signal processor in the prior art.

Figure 3:
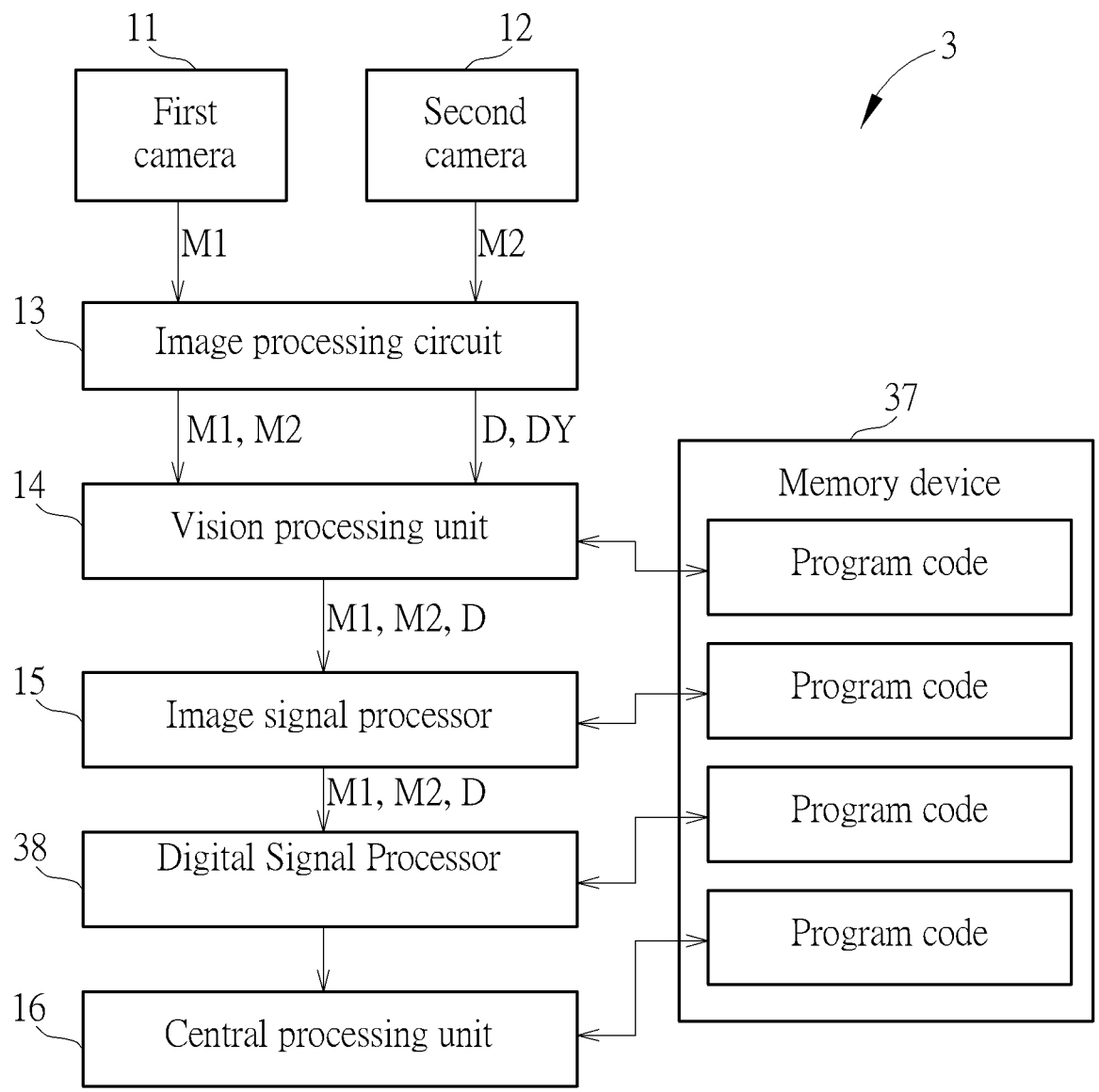
FIG. 3 is a functional block diagram of an interactive image processing system according to an embodiment of the present disclosure.

FIG. 3 is a functional block diagram of an interactive image processing system 3 according to an embodiment of the present disclosure. The interactive computation system 3 includes a first camera 11, a second camera 12, an image processing circuit 13, a vision processing unit 14, an image signal processor 15, a central processing unit 16, a memory device 37, and a digital signal processor 38.

The interactive image processing systems 1 and 3 are similar, same elements are denoted with the same symbols. The digital signal processor 38 is coupled between the image signal processor 15 and the central processing unit 16, and configured to convert the images M1 and M2 into a stereography MS according to a fourth program code and the depth data D. For example, the stereography MS includes three-dimensional object(s) projected onto a two-dimensional surface.

The memory device 37 is coupled to the digital signal processor 38, and configured to store the fourth program code for instructing the digital signal processor 38 to perform stereography conversion.

Under the architecture of the interactive image processing system 3, the present disclosure uses the image processing circuit 13 to firstly calculate the depth data D corresponding to two raw images M1 and M2, and uses the digital signal processor 38 to perform stereography conversion to ease the burden of the central processing unit 16 (Note that in the embodiment of FIG. 1, the central processing unit 16 handles the stereography conversion). Therefore, power consumption for software calculations of the central processing unit 16 may be saved.

Figure 4:
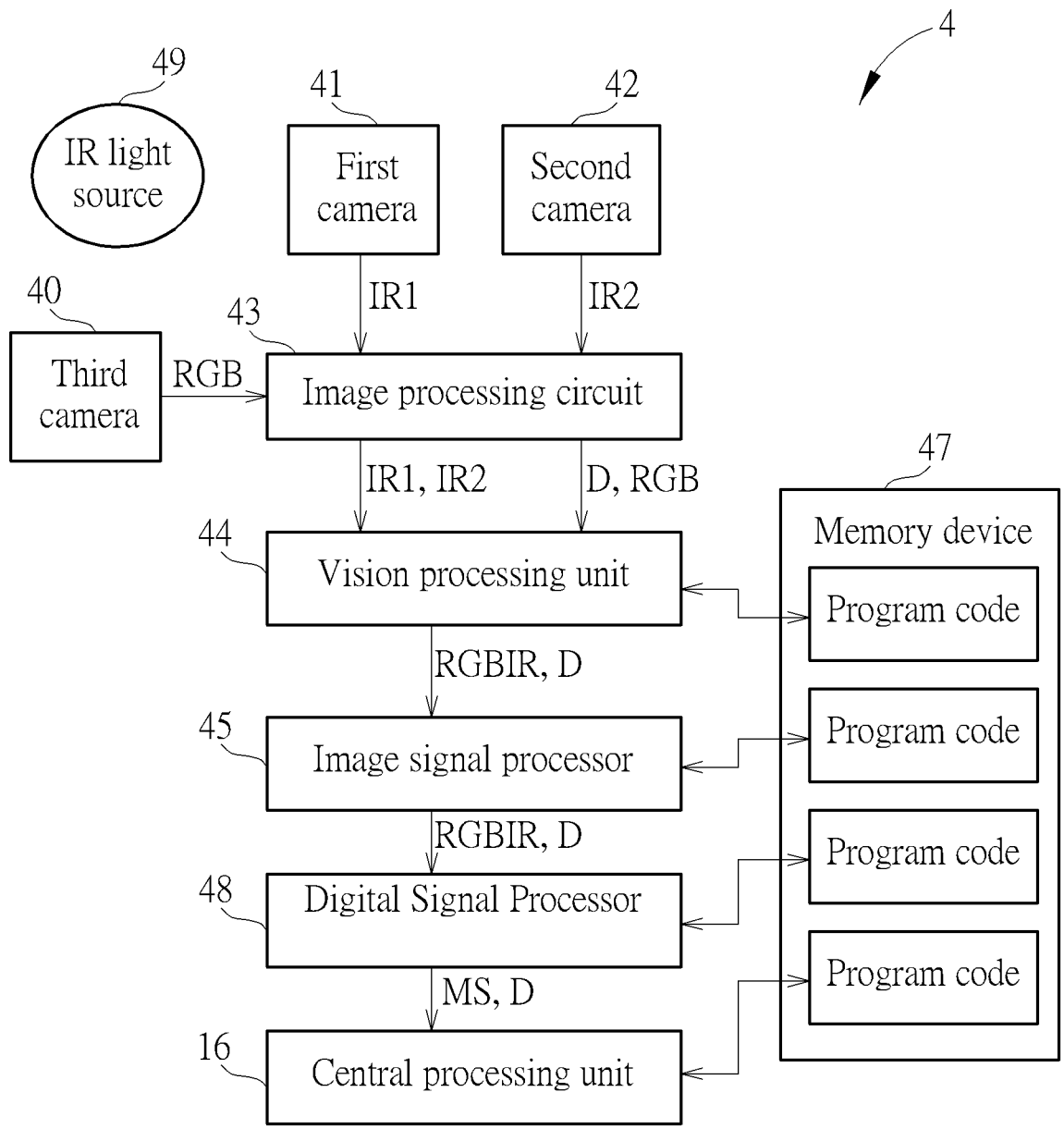
FIG. 4 is a functional block diagram of an interactive image processing system according to an embodiment of the present disclosure.

FIG. 4 is a functional block diagram of an interactive image processing system 4 according to an embodiment of the present disclosure. The interactive image processing system 4 includes a first camera 41, a second camera 42, a third camera 40, an image processing circuit 43, a vision processing unit 44, an image signal processor 45, a central processing unit 16, a memory device 47, a digital signal processor 48, and an infrared light source 49.

In this embodiment, the first camera 41 and the second camera 42 are infrared cameras for generating infrared images IR1 and IR2 (wherein image pixels of the infrared images IR1 and IR2 are defined according to greyscale values), and the third camera 40 is a RGB (red-green-blue) camera for generating a color image RGB (wherein image pixels of the color image RGB are defined by red, green, and blue pixels). The infrared light source 49 is configured to augment an available ambient light for IR (infrared) image conversion by the first camera 41 and the second camera 42.

The image processing circuit 43 is coupled to the first camera 41, the second camera 42 and the third camera 40, and configured to calculate a depth data D according to the infrared images IR1 and IR2, and the color image RGB. The image processing circuit 43 further combines the infrared images IR1 and IR2 into a same data package (e.g., IR side by side), or combines the color image RGB and the depth data D into a same data package, or combines one of the infrared images IR1 and IR2 and the depth data D into a same data package.

The vision processing unit 44 is coupled to the image processing circuit 43, and configured to perform stereo matching to the infrared images IR1 and IR2 to generate a greyscale matching image, perform color matching to the greyscale matching image and the color image RGB to generate a color matching image RGBIR (wherein image pixels of the color matching image RGBIR are defined by red, green, blue, and IR/greyscale pixels).

The image signal processor 45 is coupled to the vision processing unit 44, and configured to perform automatic white balance and exposure value calibrations to the color stereography RGBIR to improve picture quality for object recognition and depth calculation.

The digital signal processor 48 is coupled to the image signal processor 45, and configured to convert the color matching image RGBIR into a stereography MS according to the depth data D.

The central processing unit 16 is coupled to the digital signal processor 48 and the memory device 47, and configured to generate a computation result regarding applications for hand motion detection and tracking, space scanning, object scanning, AR see-through, 6 Dof, and SLAM based on the stereography MS and the corresponding depth data D.

The memory device 47 is coupled to the vision processing unit 44, the image signal processor 45, the digital signal processor 48 and the central processing unit 46, and configured to store program codes for instructing the corresponding processing units to perform specific algorithm computations.

Under the architecture of the interactive image processing system 4, the depth quality is stable when using the two IR cameras, the IR light source and the one RGB camera. Therefore, the accuracy and efficiency of the central processing unit 16 for handling applications (such as hand motion detection and tracking, space scanning, object scanning, AR see-through, and SLAM) may be improved to reach better user experience.

Figure 5:
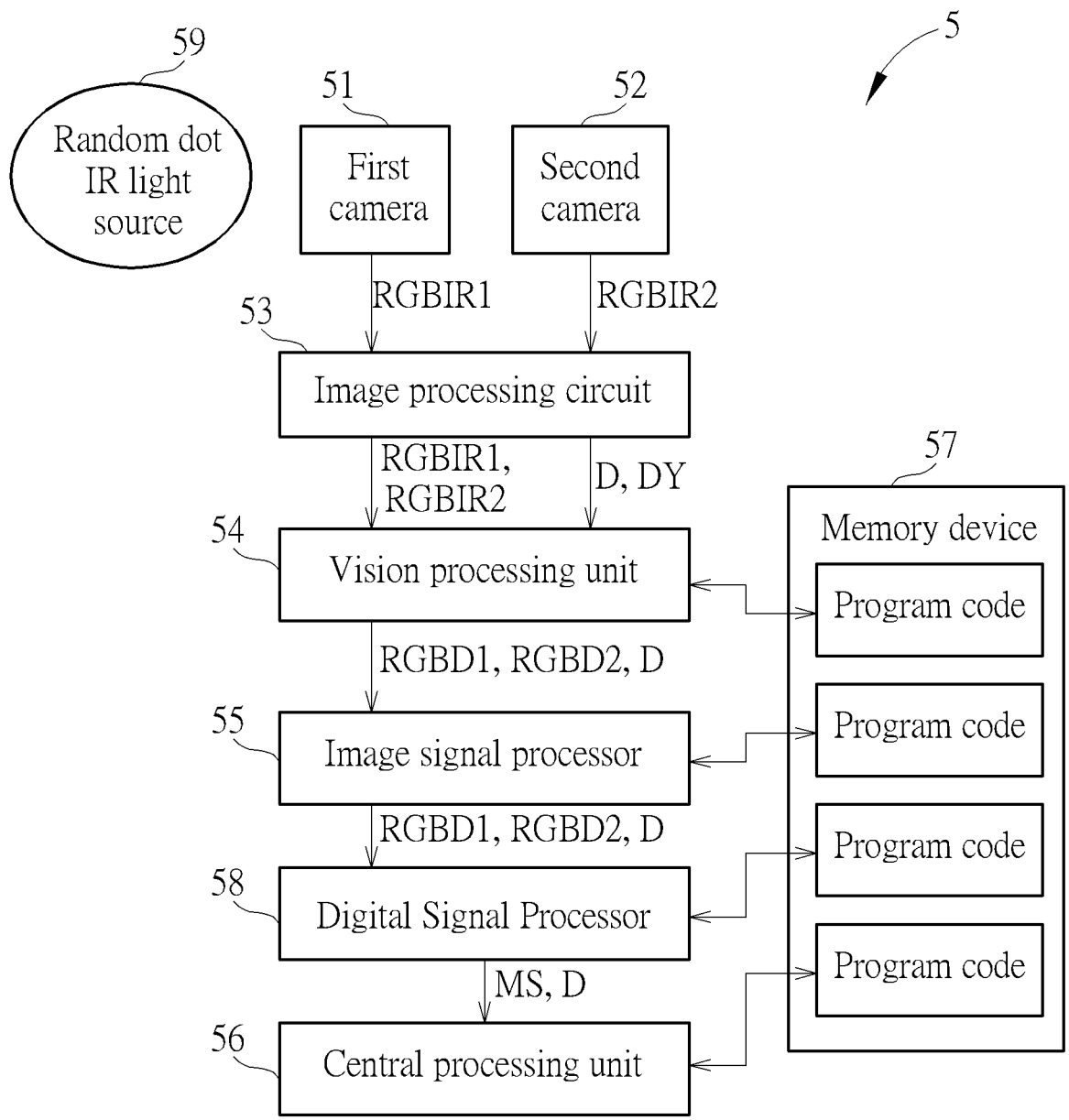
FIG. 5 is a functional block diagram of an interactive image processing system according to an embodiment of the present disclosure.

FIG. 5 is a functional block diagram of an interactive image processing system 5 according to an embodiment of the present disclosure. The interactive image processing system 5 includes a first camera 51, a second camera 52, an image processing circuit 53, a vision processing unit 54, an image signal processor 55, a central processing unit 56, a memory device 57, a digital signal processor 58, and a random dot infrared light source 59.

In this embodiment, the first camera 51 and the second camera 52 are color infrared cameras for generating color infrared images RGBIR1 and RGBIR2 (wherein image pixels of the infrared images RGBIR1 and RGBIR2 are defined by red, green, blue, and greyscale pixels). The random dot infrared light source 59 is configured to augment an available ambient light for IR image conversion by the first camera 51 and the second camera 52.

The image processing circuit 53 is coupled to the first camera 51 and the second camera 52, and configured to calculate a depth data D according to the color infrared images RGBIR1 and RGBIR2.

The image processing circuit 53 further extracts red, green, and blue pixels from the color infrared images RGBIR1 and RGBIR2 to combine color components of the color infrared images RGBIR1 and RGBIR2 into a same data package, which is known as RGB side by side to be applied to AR see-through application.

The image processing circuit 53 further extracts IR components of the color infrared images RGBIR1 and RGBIR2 into a same data package, which is known as IR side by side to be applied to SLAM, hand motion detection and tracking, and 6 Dof applications.

The image processing circuit 53 further combines the depth data D and the color component of the color infrared image RGBIR1 into a same data package, which may be applied to space scanning and object scanning applications based on a view angle of the first camera 51. In one embodiment, the image processing circuit 53 further combines the depth data D and the color component of the color infrared image RGBIR2 into a same data package, which may be applied to space scanning and object scanning applications based on a view angle of the second camera 52.

The vision processing unit 54 is coupled to the image processing circuit 53, and configured to perform stereo matching to the color infrared images RGBIR1 and RGBIR2 to generate color matching images RGBD1 and RGBD2 based on the view angles of the first camera 51 and the second camera 52, respectively.

The image signal processor 55 is coupled to the vision processing unit 54, and configured to perform automatic white balance and exposure value calibrations to the color stereography RGBD1 and RGBD2 to improve picture quality for object recognition and depth calculation.

The digital signal processor 58 is coupled to the image signal processor 55, and configured to convert the color matching image RGBD1 or RGBD2 into a stereography MS according to the depth data D.

The central processing unit 56 is coupled to the digital signal processor 58 and the memory device 57, and configured to generate a computation result regarding applications for hand motion detection and tracking, space scanning, object scanning, AR see-through, 6 Dof, and SLAM based on the stereography MS and the corresponding depth data D.

The memory device 57 is coupled to the vision processing unit 54, the image signal processor 55, the digital signal processor 58 and the central processing unit 56, and configured to store program codes for instructing the corresponding processing units to perform specific algorithm computations.

Under the architecture of the interactive image processing system 5, a high frame rate may be reached thanks to the color IR images generated by the RGBIR cameras. The depth quality is stable and will not be influenced by other light sources. Therefore, the accuracy and efficiency of the central processing unit 56 for handling applications (such as hand motion detection and tracking, space scanning, object scanning, AR see-through, and SLAM) may be improved to reach better user experience.

Figure 6:
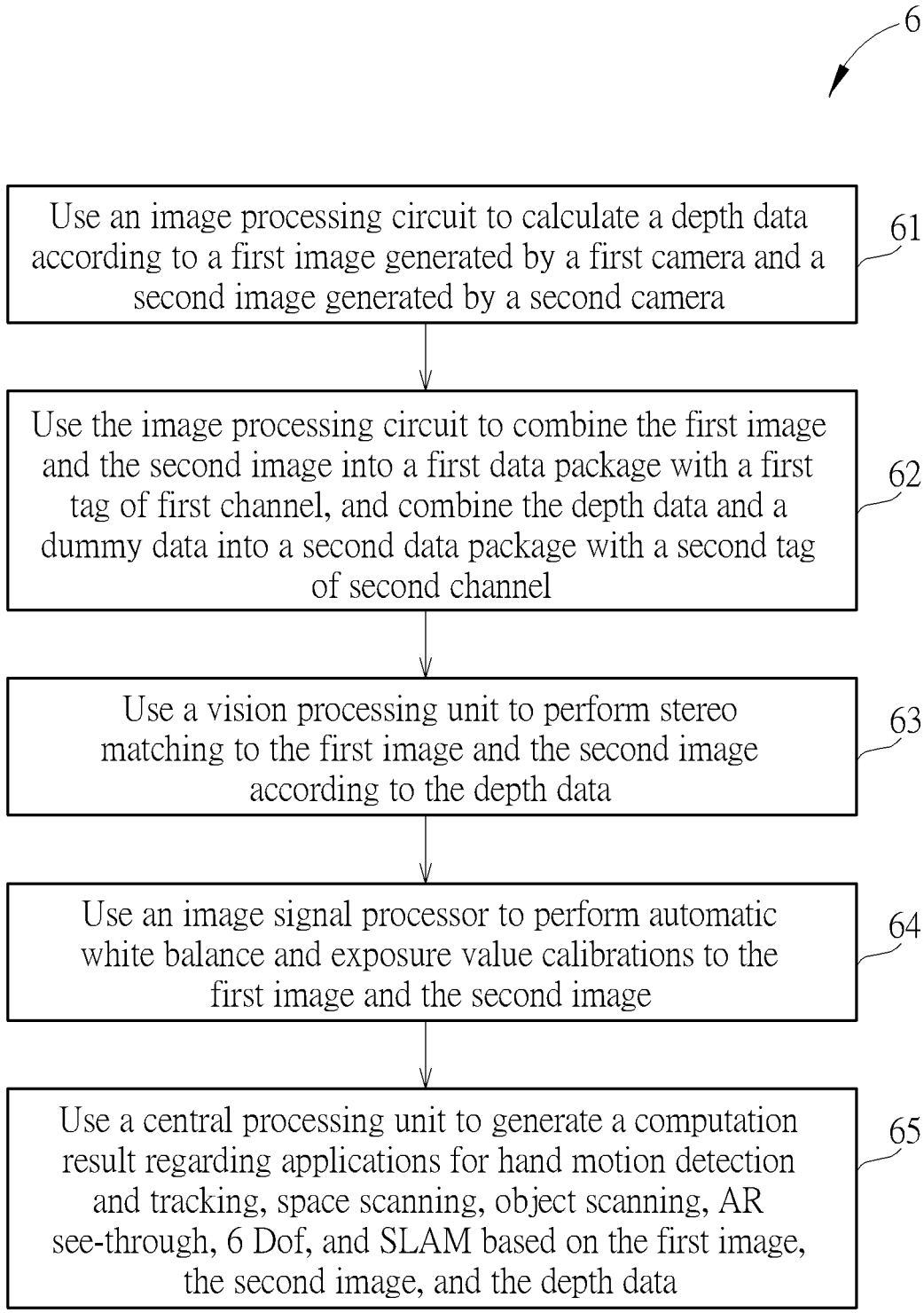
FIG. 6 is a flowchart of an interactive image processing process according to an embodiment of the present disclosure.

Operations of the interactive image processing system 1 may be summarized into an interactive image processing process 6, as shown in FIG. 6, the interactive image processing process 6 includes the following steps.

Step 61: Use an image processing circuit to calculate a depth data according to a first image generated by a first camera and a second image generated by a second camera.

Step 62: Use the image processing circuit to combine the first image and the second image into a first data package with a first tag of first channel, and combine the depth data and a dummy data into a second data package with a second tag of second channel.

Step 63: Use a vision processing unit to perform stereo matching to the first image and the second image according to the depth data.

Step 64: Use an image signal processor to perform automatic white balance and exposure value calibrations to the first image and the second image.

Step 65: Use a central processing unit to generate a computation result regarding applications for hand motion detection and tracking, space scanning, object scanning, AR see-through, 6 Dof, and SLAM based on the first image, the second image, and the depth data.

Detailed operations of the interactive image processing process 6 may be obtained by referring to descriptions of FIG. 1, which is omitted.

Figure 7:
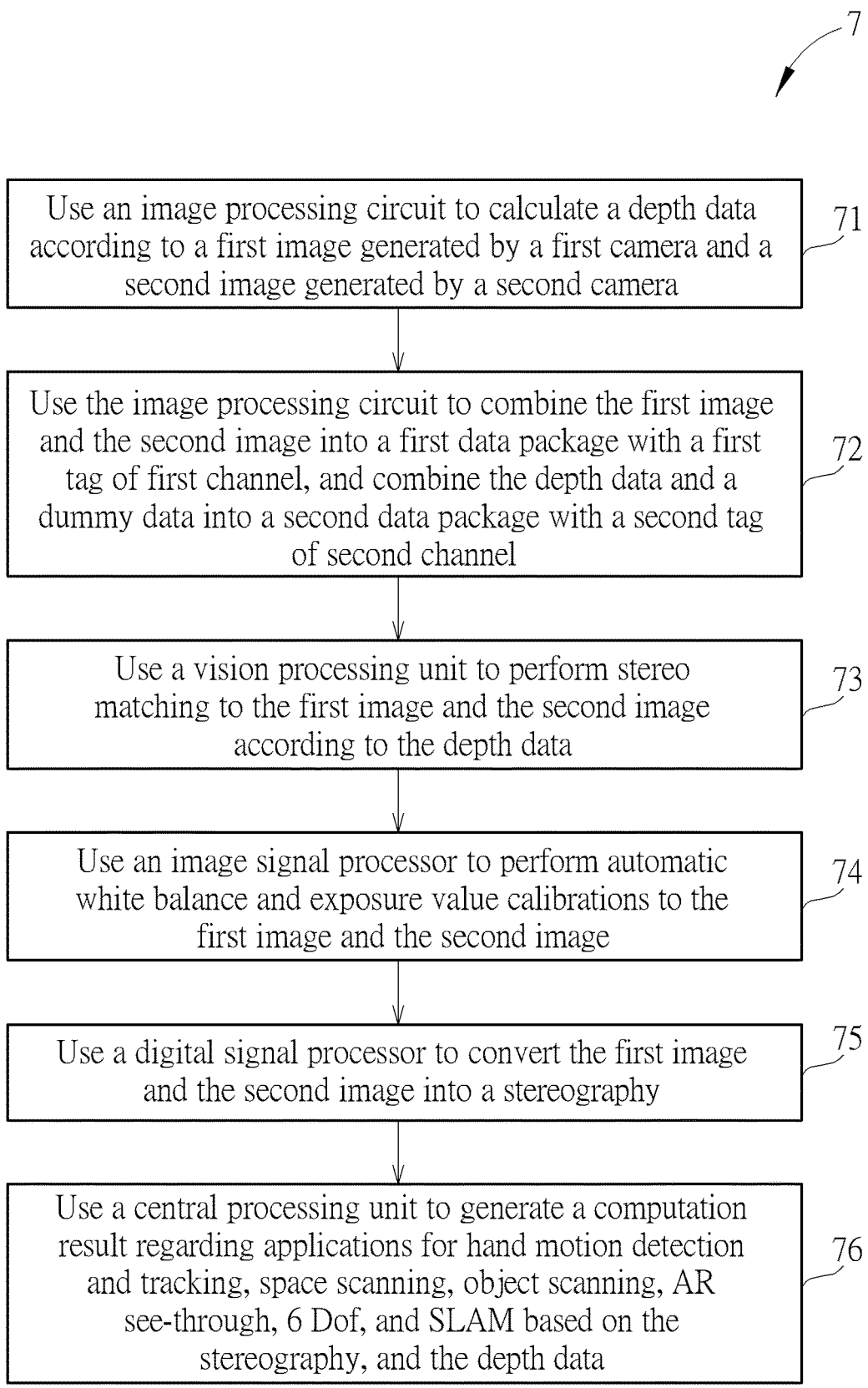
FIG. 7 is a flowchart of an interactive image processing process according to an embodiment of the present disclosure.

Operations of the interactive image processing system 3 may be summarized into an interactive image processing process 7, as shown in FIG. 7, the interactive image processing process 7 includes the following steps.

Step 71: Use an image processing circuit to calculate a depth data according to a first image generated by a first camera and a second image generated by a second camera.

Step 72: Use the image processing circuit to combine the first image and the second image into a first data package with a first tag of first channel, and combine the depth data and a dummy data into a second data package with a second tag of second channel.

Step 73: Use a vision processing unit to perform stereo matching to the first image and the second image according to the depth data.

Step 74: Use an image signal processor to perform automatic white balance and exposure value calibrations to the first image and the second image.

Step 75: Use a digital signal processor to convert the first image and the second image into a stereography.

Step 76: Use a central processing unit to generate a computation result regarding applications for hand motion detection and tracking, space scanning, object scanning, AR see-through, 6 Dof, and SLAM based on the stereography, and the depth data.

Detailed operations of the interactive image processing process 7 may be obtained by referring to descriptions of FIG. 3, which is omitted.

Note that in the prior art, different applications including motion detection and tracking, space scanning, object scanning, AR see-through, and SLAM can only be operable in specifically designed architecture and platform, because these applications are not operable and compatible in different architectures and platforms. In comparison, the present disclosure provides the architecture in which the above-mentioned applications are operable by running different algorithms stored in the central processing unit or the memory device of the interactive image processing system.

Further, the central processing unit may access two or more program codes from the memory device to perform two or more of the applications including motion detection and tracking, space scanning, object scanning, AR see-through, and SLAM, so as to achieve multitask.

To sum up, the present disclosure calculates depth data according to infrared images generated by the first and second infrared cameras to improve depth quality. Therefore, the accuracy and efficiency of the central processing unit for handling applications (such as hand motion detection and tracking, space scanning, object scanning, AR see-through, and SLAM) may be improved to reach better user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An interactive image processing system, comprising:
 a first camera configured to generate a first infrared image;
 a second camera configured to generate a second infrared image;
 a third camera configured to generate a color image;
 an image processing circuit coupled to the first camera, the second camera and the third camera, and configured to calculate a depth data according to the first infrared image, the second infrared image, and the color image; and
 a vision processing unit coupled to the image processing circuit, and configured to perform stereo matching to the first infrared image and the second infrared image to generate a greyscale matching image, and perform color matching to the greyscale matching image and the color image to generate a color matching image;
 wherein the image processing circuit combines the color image and the depth data into a first data package, the image processing circuit further combines the first infrared image and the depth data into a second data package, and the image processing circuit further combines the first infrared image and the second infrared image into a third data package.

2. The interactive image processing system of claim 1, further comprising:
 an image signal processor coupled to the vision processing unit, and configured to handle automatic white balance and exposure value calibrations to the first infrared image and the second infrared image;
 a central processing unit coupled to the image signal processor, and configured to generate a computation result; and
 a digital signal processor coupled between the image signal processor and the central processing unit, and configured to convert the first infrared image and the second infrared image into a stereography according to the depth data.

3. The interactive image processing system of claim 2, wherein the central processing unit is configured to simultaneously execute program codes for at least one of hand motion detection and tracking, space scanning, object scanning, AR (augmented reality) see-through, and SLAM (Simultaneous Localization and Mapping).

4. The interactive image processing system of claim 1, further comprising:

an infrared light source configured to augment an available ambient light for infrared image conversion by the first camera and the second camera.

5. An interactive image processing system, comprising:

a first camera configured to generate a first color infrared image;

a second camera configured to generate a second color infrared image;

an image processing circuit coupled to the first camera and the second camera, and configured to calculate a depth data according to the first color infrared image and the second color infrared image; and a vision processing unit coupled to the image processing circuit, and configured to perform stereo matching to the first color infrared image and the second color infrared image to generate a color matching image;

wherein the image processing circuit extracts red, green, and blue pixels from the first color infrared image and the second color infrared image to combine color components of the first color infrared image and the second color infrared image into a first data package, the image processing circuit extracts infrared components of the first color infrared image and the second color infrared image into a second data package, the image processing circuit further combines the depth data and the color component of the first color infrared image into a third data package, the first data package is applied to augmented reality see-through application, the second data package is applied to Simultaneous Localization and Mapping, hand motion detection and tracking, and six Degree of freedom applications, and the third data package is applied to space scanning and object scanning applications based on a view angle of the first camera.

6. The interactive image processing system of claim 5, wherein the image processing circuit combines the depth data and the color component of the second color infrared image into a fourth data package, and the fourth data package is applied to space scanning and object scanning applications based on a view angle of the second camera.

7. The interactive image processing system of claim 5, further comprising:

an image signal processor coupled to the vision processing unit, and configured to handle automatic white balance and exposure value calibrations to the first color infrared image and the second color infrared image;

a central processing unit coupled to the image signal processor, and configured to generate a computation result; and a digital signal processor coupled between the image signal processor and the central processing unit, and configured to convert the first color infrared image and the second color infrared image into a stereography according to the depth data.

8. The interactive image processing system of claim 7, wherein the central processing unit is configured to simultaneously execute program codes for at least one of hand motion detection and tracking, space scanning, object scanning, AR (augmented reality) see-through, and SLAM (Simultaneous Localization and Mapping).

9. The interactive image processing system of claim 5, further comprising:

a random dot infrared light source configured to augment an available ambient light for infrared image conversion by the first camera and the second camera.

* * * * *